(12) United States Patent
Liu

(10) Patent No.: US 8,928,628 B2
(45) Date of Patent: Jan. 6, 2015

(54) PHOTO SENSING DEVICE SUITABLE FOR OPTICAL TOUCH DISPLAY PANEL AND APPLICATIONS THEREOF

(75) Inventor: Tzu-Wei Liu, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 503 days.

(21) Appl. No.: 13/236,655

(22) Filed: Sep. 20, 2011

(65) Prior Publication Data

US 2012/0293460 A1 Nov. 22, 2012

(30) Foreign Application Priority Data

May 18, 2011 (TW) .............................. 100117424 A

(51) Int. Cl.
*G06F 3/042* (2006.01)
*G06F 3/041* (2006.01)

(52) U.S. Cl.
CPC ...................................... *G06F 3/042* (2013.01)
USPC ............................ 345/175; 345/173; 345/174

(58) Field of Classification Search
CPC ................................ G06F 3/041; G06F 3/045
USPC .................................. 345/173, 174; 324/661
See application file for complete search history.

(56) References Cited

U.S. PATENT DOCUMENTS

| 7,667,177 | B2 | 2/2010 | Sano | |
|---|---|---|---|---|
| 8,310,247 | B2 * | 11/2012 | Ota | 324/661 |
| 8,441,459 | B2 * | 5/2013 | Chen et al. | 345/174 |
| 2007/0040814 | A1 * | 2/2007 | Lee et al. | 345/173 |
| 2008/0198143 | A1 | 8/2008 | Kinoshita et al. | |
| 2009/0020686 | A1 | 1/2009 | Sano | |
| 2009/0122024 | A1 * | 5/2009 | Nakamura et al. | 345/173 |
| 2009/0284270 | A1 | 11/2009 | Ota | |
| 2011/0242044 | A1 * | 10/2011 | Liu | 345/174 |

FOREIGN PATENT DOCUMENTS

| CN | 101251783 A | 8/2008 |
|---|---|---|
| TW | 200905290 | 2/2009 |

OTHER PUBLICATIONS

"First Office Action of China Counterpart Application", issued on Jan. 4, 2013, p. 1-p. 5, in which CN101251783A was cited.
"Office Action of Taiwan Counterpart Application", issued on Jan. 17, 2014, p. 1-p. 4.

* cited by examiner

*Primary Examiner* — Kumar Patel
*Assistant Examiner* — Kuo Woo
(74) *Attorney, Agent, or Firm* — Jianq Chyun IP Office

(57) ABSTRACT

A photo sensing device suitable for an optical touch display panel and applications thereof are provided. The photo sensing device includes a photo sensing unit and a coupling unit. The photo sensing unit is used for sensing whether a touch event is happened/occurred or not, and accordingly outputting a judging signal. The coupling unit is coupled to the photo sensing unit, and is used for enhancing the sensitivity of the sensing unit, so as to increase a difference between the judging signal associated with occurrence of the touch event and the judging signal associated with non-occurrence of the touch event.

11 Claims, 7 Drawing Sheets

PHOTO SENSING DEVICE SUITABLE FOR OPTICAL TOUCH DISPLAY PANEL AND APPLICATIONS THEREOF

CROSS-REFERENCE TO RELATED APPLICATION

This application claims the priority benefit of Taiwan application serial no. 100117424, filed on May 18, 2011. The entirety of the above-mentioned patent application is hereby incorporated by reference herein and made a part of this specification.

BACKGROUND OF THE INVENTION

1. Field of the Invention

The invention relates to a photo sensing device, more particularly, to a photo sensing device suitable for an optical touch display panel.

2. Description of Related Art

A man-machine interface (MMI) refers to a medium between a user and a machine used for communication. Electronic devices sold in the market are all designed with an MMI to facilitate user's operation, so that the user can execute various functions of the electronic devices. With development of information technology and quick development and applications of wireless mobile communication and information appliances, to achieve advantages of easy carry, small size and more user-friendly in operation, input devices of many electronic devices have been changed from keyboards and mice to touch panels, and a combination of a display panel and the touch panel makes a design of the MMI more convenient.

Presently, methods of combining the touch panel and the display panel are roughly grouped into a plug-in type and a built-in type, and when the touch panel and the display panel are combined in the built-in type, it avails reducing a volume of the electronic device to reach a volume thinning demand. Therefore, the technique of building the touch panel in the display panel has gradually drawn attention, and a technique of directly building an optical touch panel in the display panel to form an optical touch display panel have become mature and stable.

Generally, the optical touch panel built in the display panel has a plurality of photo sensing devices arranged in an array for sensing touch events. If a certain photo sensing device senses a touch event, the photo sensing device outputs a corresponding judging signal to a back-end processing circuit for processing/judging, so that the electronic device having the optical touch display panel executes a corresponding function.

Taking a photo sensing device having a characteristic of a light-shading sensing mode as an example, a touch operation of a finger may shade light above the photo sensing device. Therefore, the photo sensing device would output a corresponding judging signal to achieve a touch control function. To be clear, the photo sensing device having the characteristic of the light-shading sensing mode performs a touch sensing operation according to a light-shading status of the external light. Certainly, in case of a strong external light, since the external light sensed by each of the photo sensing devices is strong, a difference (i.e. a signal strength difference) between a judging signal associated with occurrence of the touch event and a judging signal associated with non-occurrence of the touch event that are output by each of the photo sensing devices is relatively great. In this way, the back-end processing circuit can accurately determine whether the finger performs a touch operation on the optical touch display panel according to an output of each of the photo sensing devices.

Unfortunately, in case of a weak external light, since the external light sensed by each of the photo sensing devices is weak, the difference (i.e. the signal strength difference) between the judging signal associated with occurrence of the touch event and the judging signal associated with non-occurrence of the touch event that are output by each of the photo sensing devices is relatively small. In this way, the back-end processing circuit may not accurately determine whether the finger performs a touch operation on the optical touch display panel. Therefore, the existing optical touch display panel cannot be widely used in conditions of different environmental lights.

SUMMARY OF THE INVENTION

Accordingly, the invention is directed to a photo sensing device suitable for an optical touch display panel, which resolves a problem that the optical touch display panel cannot be widely used in environments with different light intensities.

The invention provides a photo sensing device including a photo sensing unit and a coupling unit. The photo sensing unit is used for sensing whether a touch event is occurred or not, and accordingly outputting a judging signal. The coupling unit is coupled to the photo sensing unit, and used for enhancing sensitivity of the photo sensing unit, so as to increase a difference between the judging signal associated with occurrence of the touch event and the judging signal associated with non-occurrence of the touch event.

The invention further provides an optical touch display panel having the aforementioned photo sensing device.

The invention further provides an electronic device having the aforementioned optical touch display panel.

According to the above descriptions, the coupling unit is used for enhancing sensitivity of the photo sensing unit, so as to increase the difference between the judging signal associated with occurrence of the touch event and the judging signal associated with non-occurrence of the touch event. Therefore, regardless of a strong external light or a weak external light, the photo sensing device can provide a corresponding judging signal to a back-end processing circuit for processing/judging, so that the back-end processing circuit can accurately determine whether a finger performs a touch operation on the optical touch display panel. Obviously, the optical touch display panel applying the photo sensing device of the invention can be widely used in conditions of different environmental lights.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
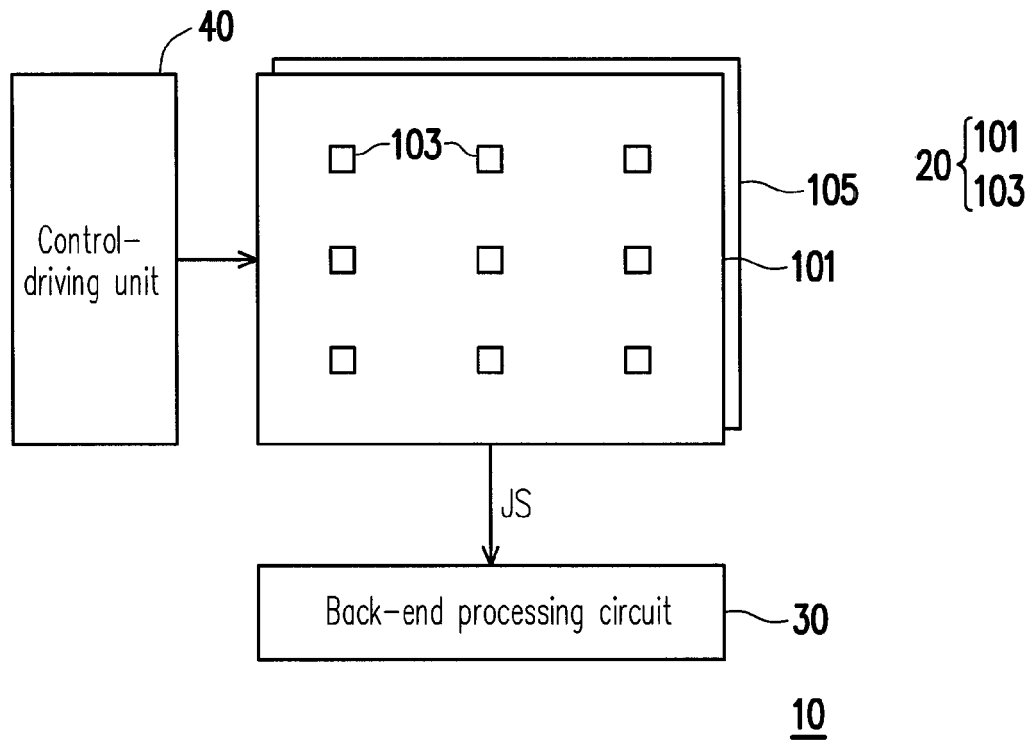
FIG. 1 is a system block schematic diagram of an electronic device 10 according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a system block schematic diagram of an electronic device 10 according to an embodiment of the invention. Referring to FIG. 1, the electronic device 10 can be a portable electronic device of any type, for example, a smart phone, a personal digital assistant (PDA), a tablet personal computer (tablet PC), etc., which at least includes an optical touch display panel 20, a back-end processing circuit 30 and a control-driving unit 40. Certainly, the electronic device 10 may further include other peripheral devices (not shown), for example, an I/O interface, a memory, and an image capturing device, etc.

In the present embodiment, the optical touch display panel 20 may include a display panel 101 having a display function, and a plurality of photo sensing devices 103 having a touch sensing function and built in the display panel 101. The display panel 101 can be a liquid crystal display (LCD) panel or an organic light emitting diode (OLED) display panel. If the display panel 101 is the LCD panel, a backlight module 105 has to be configured for providing a backlight source required by the display panel 101. Moreover, if the display panel 101 is the OLED display panel, the backlight module 105 can be omitted.

On the other hand, the photo sensing devices 103 built in the display panel 101 can be arranged in an array, and have a characteristic of a light-shading sensing mode (the number of the photo sensing devices 103 is not limited to the number of the photo sensing devices 103 shown in FIG. 1). Namely, each of the photo sensing devices 103 performs the touch sensing according to a light-shading status of the external light. When the photo sensing device 103 senses a touch event (i.e. senses a touch operation of the finger or other medium), the photo sensing device 103 outputs a corresponding judging signal JS to the back-end processing circuit 30 for processing/judging (including processing/judging a single/multi-touch operation), so that the electronic device 10 having the optical touch display panel 20 executes a corresponding function.

Besides, the display panel 101 and the photo sensing devices 103 can be controlled and driven by the control-driving unit 40. Therefore, the display panel 101 can display images, and the photo sensing devices 103 can sense whether the user performs the touch operation on the optical touch display panel 20. Moreover, the control-driving unit 40 can simultaneously have functions of a timing controller (T-con), a gate driver and a source driver, and can even serve as an operation core of the electronic device 10. In this way, the control-driving unit 40 can correspondingly control the operation of the electronic device 10 according to a processing result of the back-end processing circuit 30.

However, according to the technique disclosed in the related art, in case of a weak external light, since the external light sensed by each of the photo sensing devices built in the display panel is weak, a difference between the judging signal associated with occurrence of the touch event and the judging signal associated with non-occurrence of the touch event (i.e. the signal strength difference) that are output by each of the photo sensing devices is relatively smaller. In this way, the back-end processing circuit cannot accurately determine whether the finger performs a touch operation on the optical touch display panel.

In order to resolve the above problem, each of the photo sensing devices 103 built in the display panel 101 can provide the corresponding judging signal JS to the back-end processing circuit 30 for processing/judging in conditions of different environmental lights (for example, an outdoor environment and a dark room, etc.), so that the back-end processing circuit 30 can accurately determine whether the finger or other medium touches the optical touch display panel 20 according to the output of each of the photo sensing devices 103. In this way, the optical touch display panel 20 can be widely used in conditions of different environmental lights.

Figure 2:
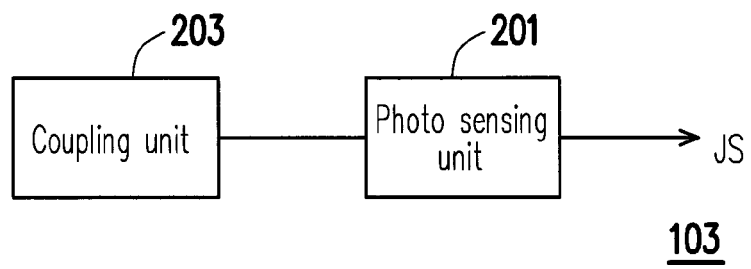
FIG. 2 is a block schematic diagram of a photo sensing device 103 of FIG. 1.

FIG. 2 is a block schematic diagram of the photo sensing device 103 of FIG. 1. Referring to FIG. 2, structures of the photo sensing devices 103 shown in FIG. 1 are similar, and a circuit configuration thereof can be an active type or a passive type. However, regardless of the active type and the passive type, each of the photo sensing devices 103 includes a photo sensing unit 201 and a coupling unit 203. The photo sensing unit 201 is used to sense whether a touch event is occurred or not, and accordingly output the judging signal JS. The coupling unit 203 is coupled to the photo sensing unit 201, and is used to enhance sensitivity of the photo sensing unit 201, so as to increase a difference (i.e. a signal strength difference) between the judging signal JS associated with occurrence of the touch event and the judging signal JS associated with non-occurrence of the touch event that are output by the photo sensing unit 201.

Figure 3:
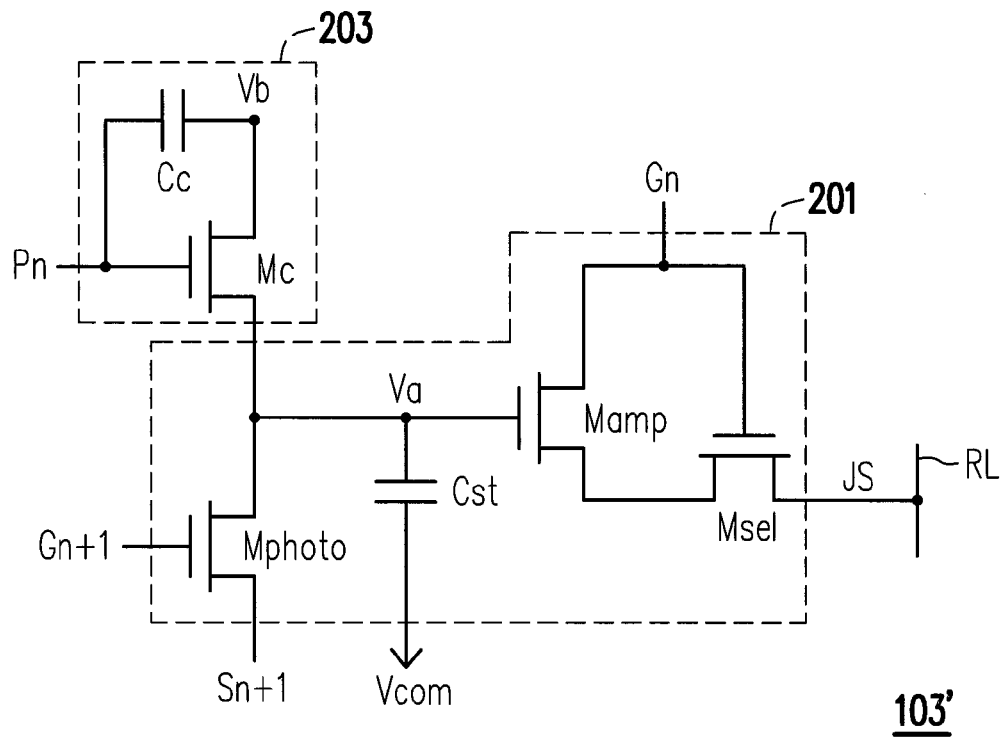
FIG. 3 is a circuit diagram of an active type photo sensing device 103' according to an embodiment of the invention.

In detail, FIG. 3 is a circuit diagram of an active type photo sensing device 103' according to an embodiment of the invention. Referring to FIG. 2 and FIG. 3, the photo sensing unit 201 of the active type photo sensing device 103' includes a photo sensing transistor Mphoto, an amplifying transistor Mamp, a selection transistor Msel and a storage capacitor Cst. Moreover, the coupling unit 203 of the active type photo sensing device 103' includes a coupling transistor Mc and a coupling capacitor Cc.

A first end of the coupling transistor Mc receives a first control signal Pn. A first end of the coupling capacitor Cc is coupled to the first end of the coupling transistor Mc, and a second end of the coupling capacitor Cc is coupled to a second end of the coupling transistor Mc. A first end of the photo sensing transistor Mphoto receives a second control signal Gn+1, a second end of the photo sensing transistor Mphoto receives a third control signal Sn+1, and a third end of the photo sensing transistor Mphoto is coupled to a third end of the coupling transistor Mc. A first end of the storage capacitor Cst is coupled to the third end of the photo sensing transistor Mphoto, and a second end of the storage capacitor Cst receives a fourth control signal (which is, for example, associated with a common voltage Vcom of the display panel 101, though the invention is not limited thereto, i.e. a reference potential).

A first end of the amplifying transistor Mamp is coupled to the first end of the storage capacitor Cst, and a second end of the amplifying transistor Mamp receives a fifth control signal Gn. A first end of the selection transistor Msel receives the fifth control signal Gn, a second end of the selection transistor Msel is coupled to a third end of the amplifying transistor Mamp, and a third end of the selection transistor Msel is coupled to a readout line RL for outputting the judging signal JS to the back-end processing circuit 30. In the present embodiment, the first control signal Pn is a negative pulse signal, and the second, the third and the fifth control signals Gn+1, Sn+1 and Gn are positive pulse signals. Moreover, the coupling transistor Mc, the photo sensing transistor Mphoto, the amplifying transistor Mamp and the selection transistor Msel are all N-type transistors.

Figure 4:
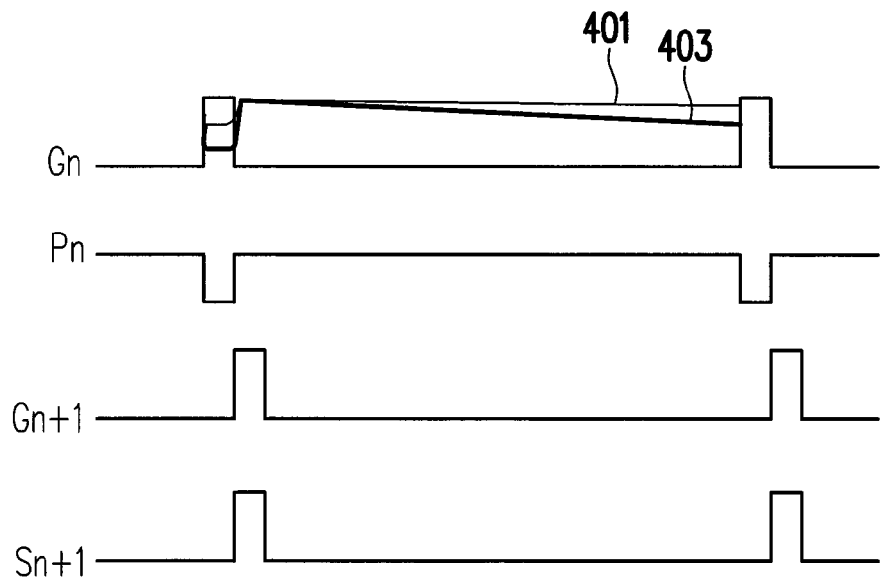
FIG. 4 is an operation waveform diagram of the active type photo sensing device 103' of FIG. 3.

FIG. 4 is an operation waveform diagram of the active type photo sensing device 103' of FIG. 3. Referring to FIG. 3 and FIG. 4, and in FIG. 4, waveforms of the first, the second, the third and the fifth control signals Pn, Gn+1, Sn+1 and Gn are illustrated. When the second and the third control signals Gn+1 and Sn+1 are in a high level, the photo sensing transistor Mphoto is in a turn on state, so that a terminal voltage Va of the storage capacitor Cst is charged to a high level the same to that of the third control signal Sn+1. When the second control signal Gn+1 is in a low level, the photo sensing transistor Mphoto starts to leak electricity (for example, a curve 401 or a curve 403), and an electricity leakage degree thereof relates to illuminance of the environmental light and an operation voltage of the photo sensing transistor Mphoto. Generally, when the photo sensing transistor Mphoto is irradiated by light (i.e. the finger or other medium does not shade the active photo sensing device 103'), the electricity leakage degree of the photo sensing transistor Mphoto is exacerbated (for example, the curve 403). Comparatively, when the photo sensing transistor Mphoto is not irradiated by light (i.e. the finger or other medium shades the active photo sensing device 103'), the electricity leakage degree of the photo sensing transistor Mphoto is mitigated (for example, the curve 401).

On the other hand, since the coupling transistor Mc is kept in the turn on state in response to the high level of the first control signal Pn, a terminal voltage Vb of the coupling transistor Mc is almost the same to the terminal voltage Va of the storage capacitor Cst. It is thus clear that when the photo sensing transistor Mphoto is irradiated by light, a gate-source voltage Vgs of the coupling transistor Mc is relatively great, and when the photo sensing transistor Mphoto is not irradiated by light, the gate-source voltage Vgs of the coupling transistor Mc is relatively small. Therefore, when the first control signal Pn is in the low level, and the fifth control signal Gn is in the high level, the amplifying transistor Mamp and the selection transistor Msel are in the turn on state.

Meanwhile, the photo sensing unit 201 of the active type photo sensing device 103' outputs the judging signal JS associated with the terminal voltage Va of the storage capacitor Cst to the readout line RL. Moreover, when the first control signal Pn is in the low level, a leakage slope associated with the relatively small terminal voltage Va is relatively great (due to that the gate-source voltage Vgs is relatively great), and comparatively, a leakage slope associated with the relatively large terminal voltage Va is relatively small (due to that the gate-source voltage Vgs is relatively small). Therefore, the difference between the judging signal JS associated with occurrence of the touch event and the judging signal JS associated with non-occurrence of the touch event that are output by the photo sensing unit 201 of the active type photo sensing device 103' is enlarged, so that the back-end processing circuit 30 can accurately determine whether the finger performs a touch operation according to the output of each of the photo sensing units 201 of the active type photo sensing device 103'. Obviously, the coupling device 203 of the active type photo sensing device 103' can enhance the sensitivity of the photo sensing unit 201 of the active type photo sensing device 103', and the back-end processing circuit 30 thus can accurately determine whether the finger or other medium performs a touch operation on the optical touch display panel 20.

Figure 5A:
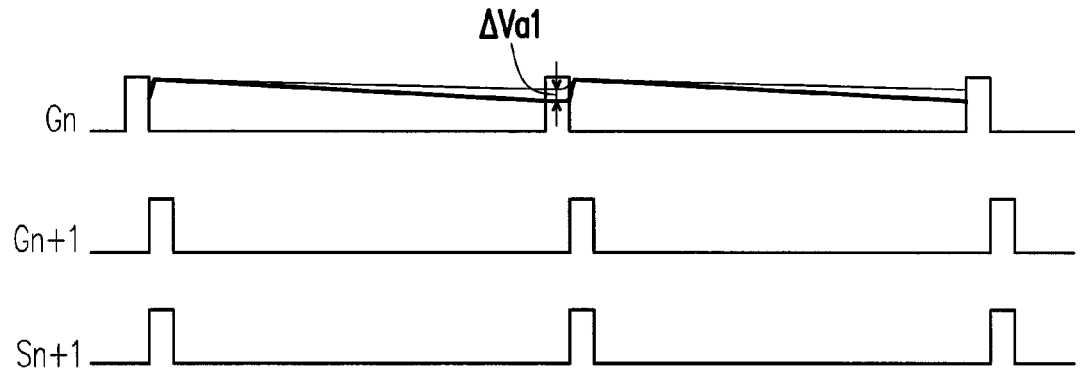
FIG. 5A and FIG. 5B are respectively diagrams illustrating variations of a terminal voltage Va of a storage capacitor Cst under conditions of not having a coupling unit 203 and having the coupling unit 203.
Figure 5B:
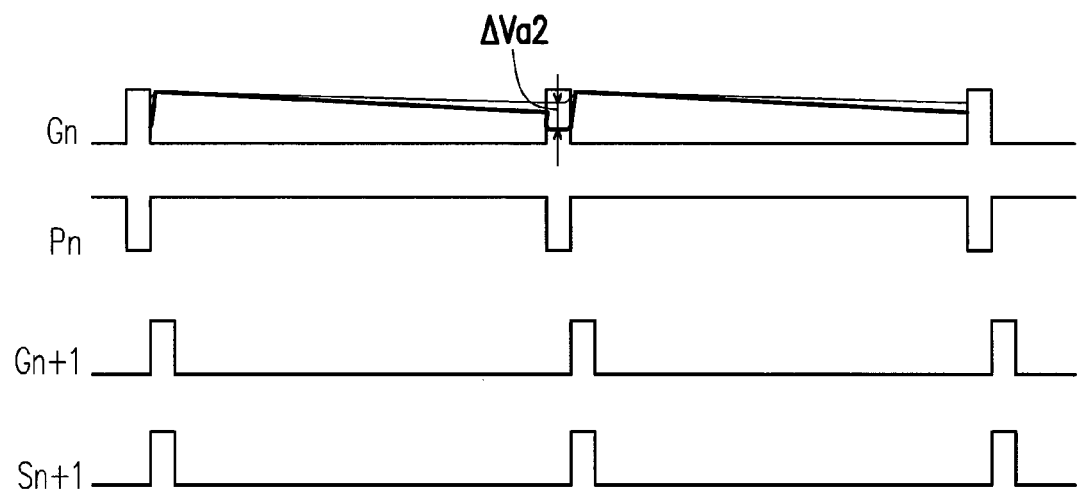

In detail, FIG. 5A and FIG. 5B are respectively diagrams illustrating variations of the terminal voltage Va of the storage capacitor Cst under conditions of not having the coupling unit 203 and having the coupling unit 203. Referring to FIG. 5A 5B, in FIG. 5A, it is obvious that under the condition of not having the coupling unit 203, when the fifth control signal Gn is in the high level, the difference between the judging signal JS associated with occurrence of the touch event and the judging signal JS associated with non-occurrence of the touch event is relatively small, i.e. a variation ΔVa1 of the terminal voltage Va of the storage capacitor Cst is relatively small. On the other hand, in FIG. 5B, it is obvious that under the condition of having the coupling unit 203, when the fifth control signal Gn is in the high level, the difference between the judging signal JS associated with occurrence of the touch event and the judging signal JS associated with non-occurrence of the touch event is relatively great, i.e. a variation ΔVa2 of the terminal voltage Va of the storage capacitor Cst is relatively large. Therefore, the back-end processing circuit 30 can accurately determine whether the finger or other medium performs a touch operation on the optical touch display panel 20.

Figure 6:
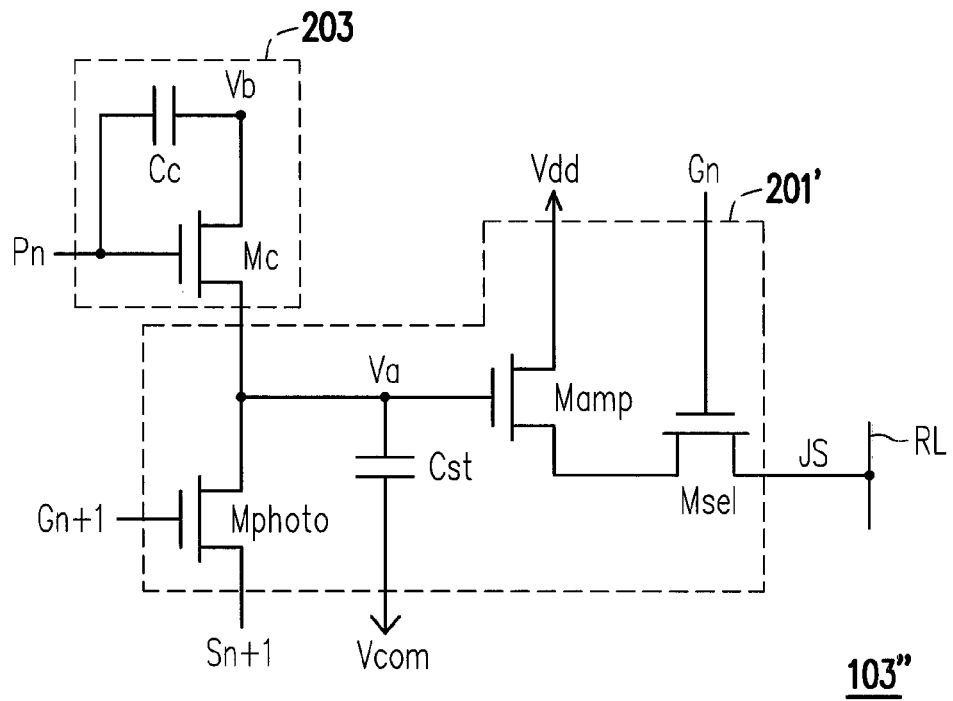
FIG. 6 is a circuit diagram of an active type photo sensing device 103" according to another embodiment of the invention.
Figure 7:
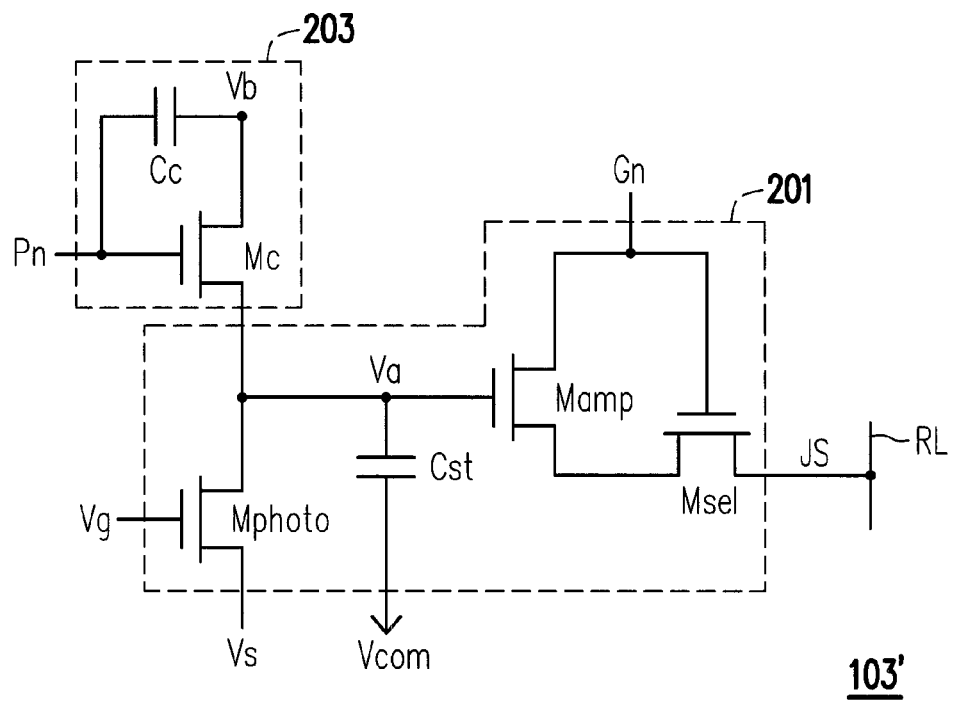
FIG. 7 is a variation of FIG. 3
Figure 8:
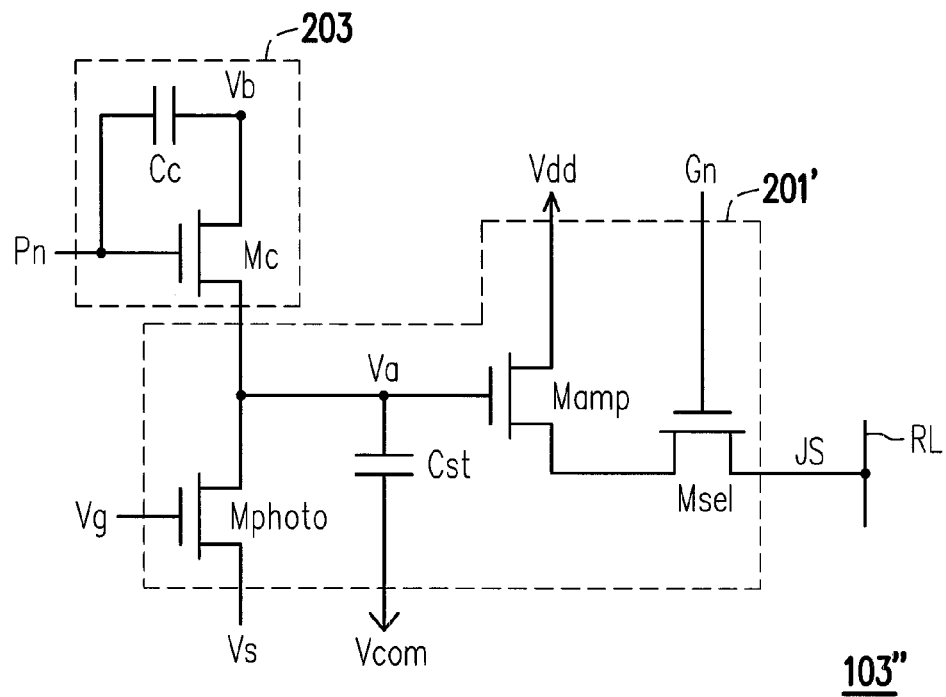
FIG. 8 is a variation of FIG. 6.

Moreover, FIG. 6 is a circuit diagram of an active type photo sensing device 103" according to another embodiment of the invention. Referring to FIG. 3 and FIG. 6, a difference between the active type photo sensing device 103" and the active type photo sensing device 103' is that the second end of the amplifying transistor Mamp in a photo sensing unit 201' of the active type photo sensing device 103" is changed to receive a system potential Vdd. In the present embodiment, operation principle of the active type photo sensing device 103" is similar to that of the active type photo sensing device 103', so that detailed descriptions thereof are not repeated. Moreover, the first end and the second end of the photo sensing transistor Mphoto in the photo sensing units 201 and 201' of FIG. 3 and FIG. 6 can also be respectively changed to receive two reference potentials Vg and Vs, as that shown in FIG. 7 and FIG. 8.

Figure 9:
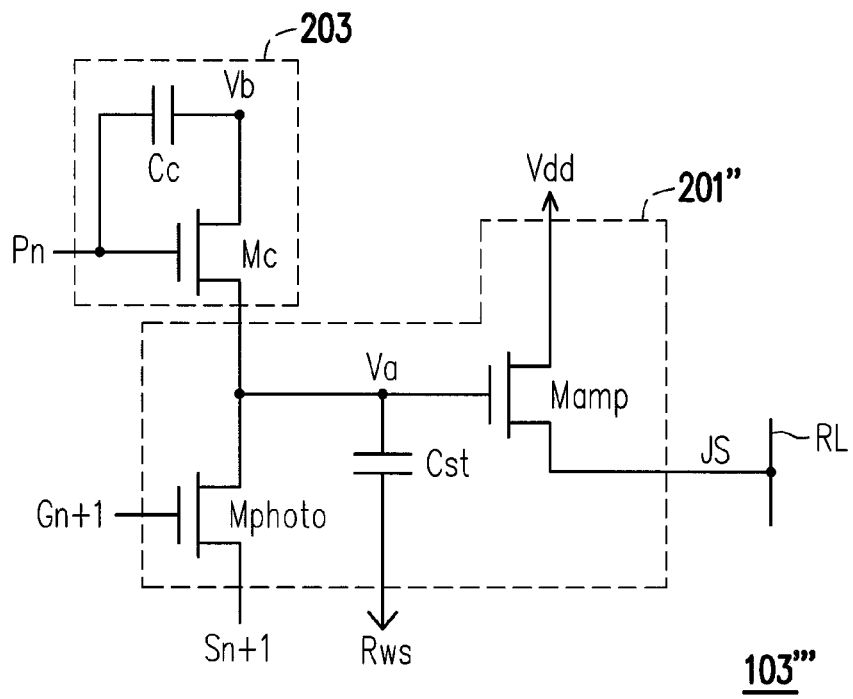
FIG. 9 is a circuit diagram of an active type photo sensing device 103''' according to still another embodiment of the invention.

Moreover, FIG. 9 is a circuit diagram of an active type photo sensing device 103''' according to still another embodiment of the invention. Referring to FIG. 3 and FIG. 9, a difference between the active type photo sensing device 103''' and the active type photo sensing device 103' is that a photo sensing unit 201" of the active type photo sensing device 103''' does not have the selection transistor Msel. In other words, the selection transistor Msel in the photo sensing unit 201 of the active type photo sensing device 103' is removed, and the second end of the amplifying transistor Mamp is changed to receive the system potential Vdd, and the third end of the amplifying transistor Mamp is directly coupled to the readout line RL. Besides, the second end of the storage capacitor Cst is changed to receive a fourth control signal Rws, and the fourth control signal Rws is a positive pulse signal.

Figure 10:
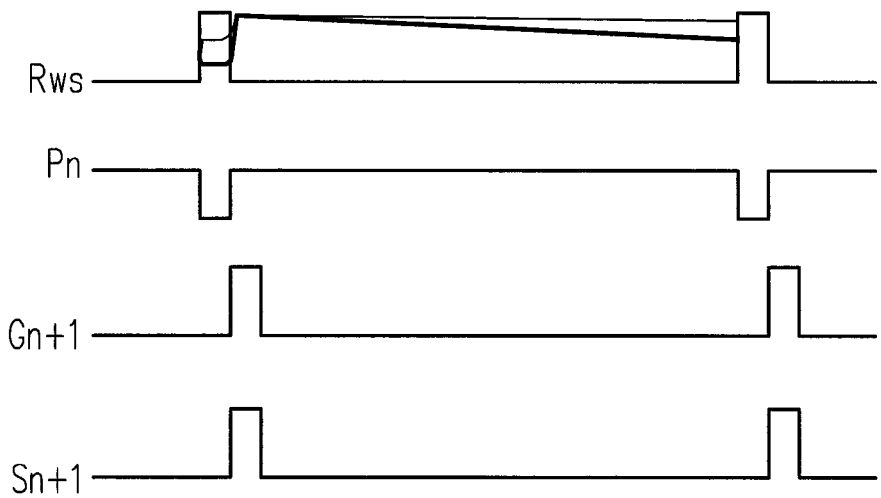
FIG. 10 is an operation waveform diagram of the active type photo sensing device 103''' of FIG. 9.
Figure 11:
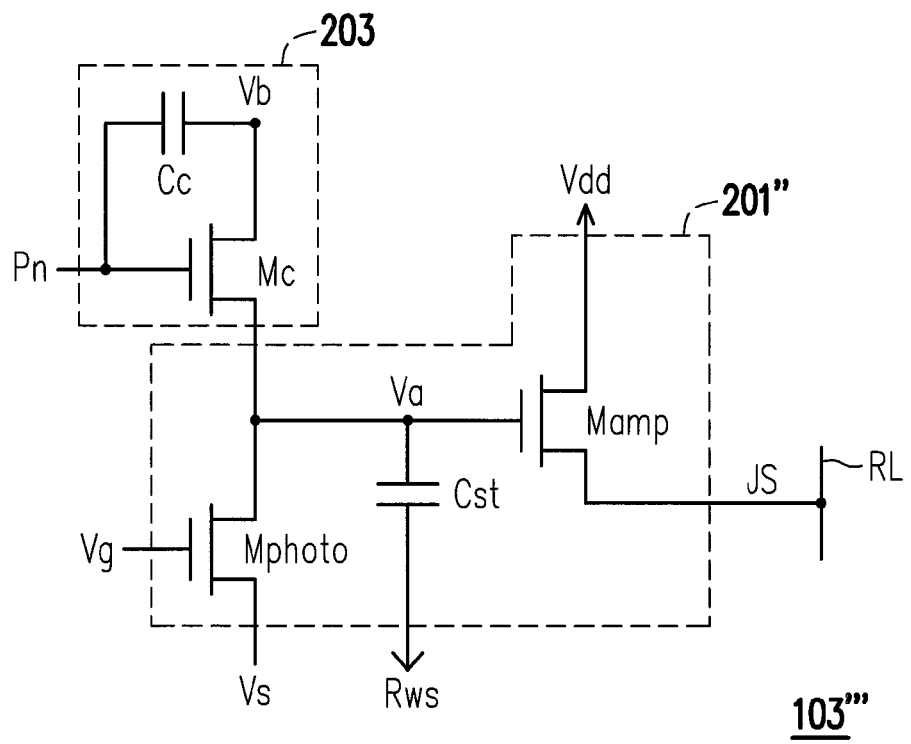
FIG. 11 is a variation of FIG. 9.

FIG. 10 is an operation waveform diagram of the active type photo sensing device 103''' of FIG. 9. Referring to FIG. 10, waveforms of the first, the second, the third and the fourth control signals Pn, Gn+1, Sn+1 and Rws are illustrated. An operation method of the active type photo sensing device 103''' is similar to that of the active type photo sensing device 103', and a difference there between is that when the first control signal Pn is in the low level and when the fourth control signal Rws is in the high level, the amplifying transistor Mamp is in the turn on state. Meanwhile, the photo sensing unit 201'' of the active type photo sensing device 103''' outputs the judging signal JS associated with the terminal voltage Va of the storage capacitor Cst to the readout line RL. In the present embodiment, the coupling unit 203 of the active type photo sensing device 103''' may also enhance the sensitivity of the photo sensing unit 201'' of the active type photo sensing device 103''', so that the back-end processing circuit 30 can accurately determine whether the finger or other medium performs a touch operation on the optical touch display panel 20. Similarly, the first end and the second end of the photo sensing transistor Mphoto in the photo sensing unit 201'' of FIG. 9 can also be respectively changed to receive the two reference potentials Vg and Vs, as that shown in FIG. 11.

Figure 12:
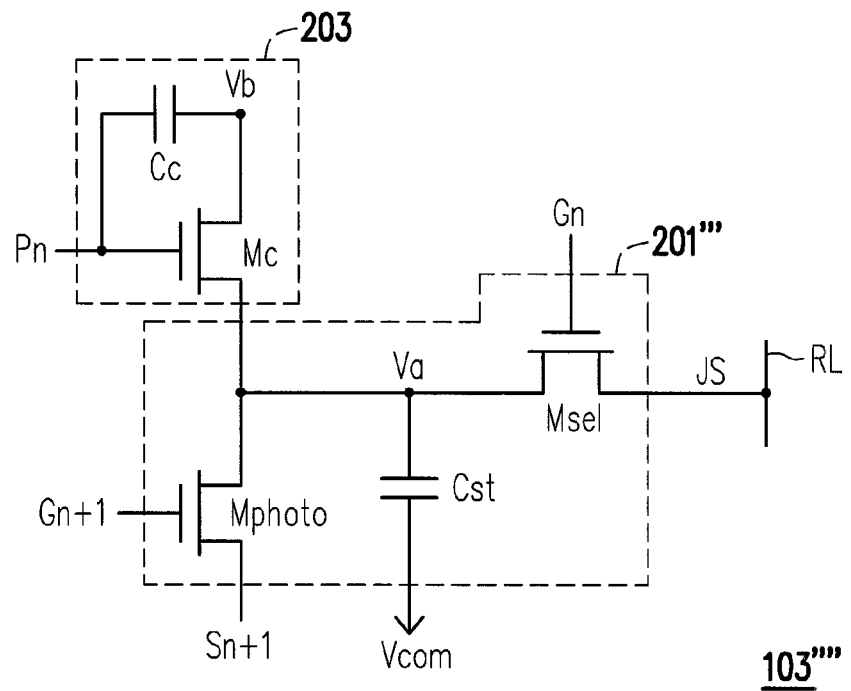
FIG. 12 is a circuit diagram of a passive type photo sensing device 103'''' according to an embodiment of the invention.

Moreover, FIG. 12 is a circuit diagram of a passive type photo sensing device 103'''' according to an embodiment of the invention. Referring to FIG. 3 and FIG. 12, a difference between the passive type photo sensing device 103'''' and the active type photo sensing device 103' is only that a photo sensing unit 201''' of the passive type photo sensing device 103'''' does not have the amplifying transistor Mamp. In other words, the amplifying transistor Mamp of the photo sensing unit 201 of the active type photo sensing device 103' is removed, and the second end of the selection transistor Msel is directly coupled to the first end of the storage capacitor Cst. Moreover, the first, the second, the third and the fifth control signals Pn, Gn+1, Sn+1 and Gn shown in FIG. 4 can also be applied to the passive type photo sensing device 103'''' shown in FIG. 12, and an operation principle of the passive type photo sensing device 103'''' is similar to that of the active type photo sensing device 103', so that detailed descriptions thereof are not repeated.

Figure 13:
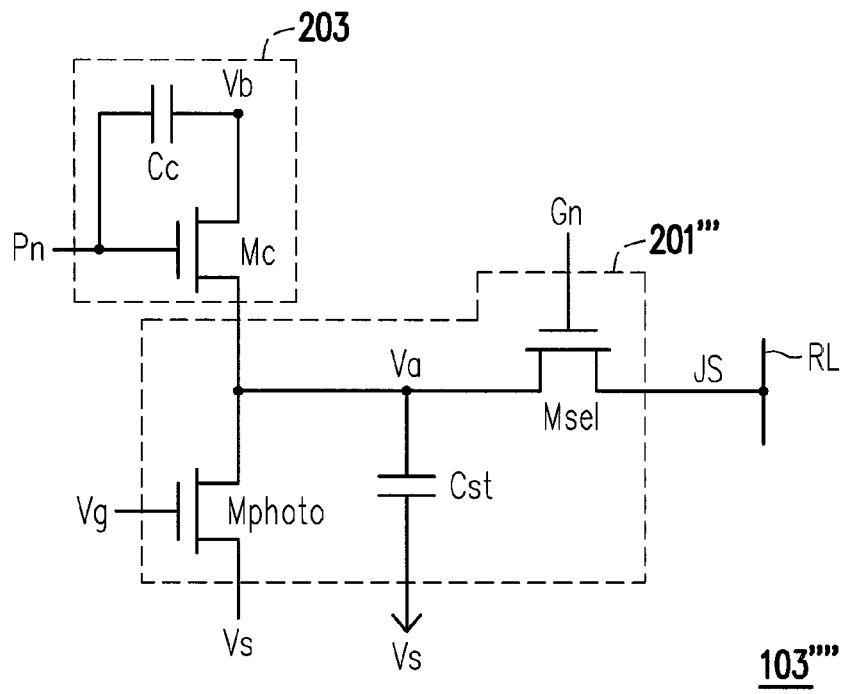
FIG. 13 is a variation of FIG. 12.

Similarly, the coupling unit 203 of the passive type photo sensing device 103'''' may also enhance the sensitivity of the photo sensing unit 201''' of the passive type photo sensing device 103'''', so that the back-end processing circuit 30 can also accurately determine whether the finger or other medium performs a touch operation on the optical touch display panel 20. Moreover, the first end and the second end of the photo sensing transistor Mphoto in the photo sensing unit 201''' of FIG. 12 can also be respectively changed to receive the two reference potentials Vg and Vs, and the second end of the storage capacitor Cst can be changed to receive the reference potential Vs, as that shown in FIG. 13.

According to the above descriptions, the coupling unit disclosed in the above embodiments can be applied in both of the active type and the passive type photo sensing devices. Since circuit configurations of the active type and the passive type photo sensing devices are diversified, only several aforementioned active type and passive type photo sensing devices are provided for descriptions, though the invention is not limited thereto.

In summary, the coupling unit is used for enhancing sensitivity of the photo sensing unit, so as to increase the difference between the judging signal associated with occurrence of the touch event and the judging signal associated with non-occurrence of the touch event. Therefore, regardless of a strong external light or a weak external light, the photo sensing device can provide a corresponding judging signal to a back-end processing circuit for processing/judging, so that the back-end processing circuit can accurately determine whether a finger performs a touch operation on the optical touch display panel. Obviously, the optical touch display panel applying the photo sensing device of the invention can be widely used in conditions of different environmental lights.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A photo sensing device comprising:
  a photo sensing unit, sensing whether a touch event has occurred or not, and accordingly outputting a judging signal; and
  a coupling unit, coupled to the photo sensing unit, for enhancing sensitivity of the photo sensing unit, so as to increase a difference between the judging signal associated with occurrence of the touch event and the judging signal associated with non-occurrence of the touch event,
  wherein the coupling unit comprises:
    a coupling transistor having a first end receiving a first control signal and a second end; and
    a coupling capacitor, having a first end coupled to the first end of the coupling transistor, and a second end coupled to the second end of the coupling transistor,
  wherein the photo sensing unit comprises:
    a photo sensing transistor having a first end receiving a second control signal, a second end receiving a third control signal, and a third end coupled to a third end of the coupling transistor;
    a storage capacitor having a first end coupled to the third end of the photo sensing transistor and a second end receiving a fourth control signal; and
    a selection transistor, having a first end receiving a fifth control signal, a second end coupled to the first end of the storage capacitor, and a third end coupled to a readout line for outputting the judging signal,
  wherein the first control signal is a negative pulse signal, wherein the second, the third and the fifth control signals are positive pulse signals, and wherein the fourth control signal is a reference potential.

2. The photo sensing device as claimed in claim 1, wherein the coupling transistor, the photo sensing transistor and the selection transistor are N-type transistors.

3. A photo sensing device comprising:
  a photo sensing unit, sensing whether a touch event has occurred or not, and accordingly outputting a judging signal; and
  a coupling unit, coupled to the photo sensing unit, for enhancing sensitivity of the photo sensing unit, so as to increase a difference between the judging signal associated with occurrence of the touch event and the judging signal associated with non-occurrence of the touch event,
  wherein the coupling unit comprises:
    a coupling transistor having a first end receiving a first control signal and a second end; and a coupling capacitor, having a first end coupled to the first end of the coupling transistor, and a second end coupled to the second end of the coupling transistor, wherein the photo sensing unit comprises:

a photo sensing transistor having a first end receiving a second control signal, a second end receiving a third control signal, and a third end coupled to a third end of the coupling transistor;

a storage capacitor having a first end coupled to the third end of the photo sensing transistor and a second end receiving a fourth control signal; and a selection transistor, having a first end receiving a fifth control signal, a second end coupled to the first end of the storage capacitor, and a third end coupled to a readout line for outputting the judging signal, wherein the first control signal is a negative pulse signal, wherein the second, the third and the fourth control signals are reference potentials, and wherein the fifth control signal is a positive pulse signal.

4. A photo sensing device comprising:

a photo sensing unit, sensing whether a touch event has occurred or not, and accordingly outputting a judging signal; and a coupling unit, coupled to the photo sensing unit, for enhancing sensitivity of the photo sensing unit, so as to increase a difference between the judging signal associated with occurrence of the touch event and the judging signal associated with non-occurrence of the touch event, wherein the coupling unit comprises:

a coupling transistor having a first end receiving a first control signal and a second end; and a coupling capacitor, having a first end coupled to the first end of the coupling transistor, and a second end coupled to the second end of the coupling transistor, wherein the photo sensing unit comprises:

a photo sensing transistor having a first end receiving a second control signal, a second end receiving a third control signal, and a third end coupled to a third end of the coupling transistor;

a storage capacitor having a first end coupled to the third end of the photo sensing transistor and a second end receiving a fourth control signal;

a selection transistor, having a first end receiving a fifth control signal, a second end coupled to the first end of the storage capacitor, and a third end coupled to a readout line for outputting the judging signal; and an amplifying transistor, having a first end coupled to the first end of the storage capacitor, a second end receiving the fifth control signal, and a third end coupled to the second end of the selection transistor, wherein the first control signal is a negative pulse signal, wherein the second, the third and the fifth control signals are positive pulse signals, and wherein the fourth control signal is a reference potential.

5. The photo sensing device as claimed in claim 4, wherein the coupling transistor, the photo sensing transistor, the selection transistor and the amplifying transistor are N-type transistors.

6. A photo sensing device comprising:

a photo sensing unit, sensing whether a touch event has occurred or not, and accordingly outputting a judging signal; and a coupling unit, coupled to the photo sensing unit, for enhancing sensitivity of the photo sensing unit, so as to increase a difference between the judging signal associated with occurrence of the touch event and the judging signal associated with non-occurrence of the touch event, wherein the coupling unit comprises:

a coupling transistor having a first end receiving a first control signal and a second end; and a coupling capacitor, having a first end coupled to the first end of the coupling transistor, and a second end coupled to the second end of the coupling transistor, wherein the photo sensing unit comprises:

a photo sensing transistor having a first end receiving a second control signal, a second end receiving a third control signal, and a third end coupled to a third end of the coupling transistor;

a storage capacitor having a first end coupled to the third end of the photo sensing transistor and a second end receiving a fourth control signal;

a selection transistor, having a first end receiving a fifth control signal, a second end coupled to the first end of the storage capacitor, and a third end coupled to a readout line for outputting the judging signal; and an amplifying transistor, having a first end coupled to the first end of the storage capacitor, a second end receiving the fifth control signal, and a third end coupled to the second end of the selection transistor, wherein the first control signal is a negative pulse signal, wherein the second and the third control signals are positive pulse signals, the fourth control signal is a reference potential, and wherein the fifth control signal is a system potential.

7. A photo sensing device comprising:

a photo sensing unit, sensing whether a touch event has occurred or not, and accordingly outputting a judging signal; and a coupling unit, coupled to the photo sensing unit, for enhancing sensitivity of the photo sensing unit, so as to increase a difference between the judging signal associated with occurrence of the touch event and the judging signal associated with non-occurrence of the touch event, wherein the coupling unit comprises:

a coupling transistor having a first end receiving a first control signal and a second end; and a coupling capacitor, having a first end coupled to the first end of the coupling transistor, and a second end coupled to the second end of the coupling transistor, wherein the photo sensing unit comprises:

a photo sensing transistor having a first end receiving a second control signal, a second end receiving a third control signal, and a third end coupled to a third end of the coupling transistor;

a storage capacitor having a first end coupled to the third end of the photo sensing transistor and a second end receiving a fourth control signal;

a selection transistor, having a first end receiving a fifth control signal, a second end coupled to the first end of the storage capacitor, and a third end coupled to a readout line for outputting the judging signal; and an amplifying transistor, having a first end coupled to the first end of the storage capacitor, a second end receiving the fifth control signal, and a third end coupled to the second end of the selection transistor, wherein the first control signal is a negative pulse signal, wherein the second, the third and the fourth control signals are reference potentials, and wherein the fifth control signal is a positive pulse signal.

8. A photo sensing device comprising:
a photo sensing unit, sensing whether a touch event has occurred or not, and accordingly outputting a judging signal; and
a coupling unit, coupled to the photo sensing unit, for enhancing sensitivity of the photo sensing unit, so as to increase a difference between the judging signal associated with occurrence of the touch event and the judging signal associated with non-occurrence of the touch event,
wherein the coupling unit comprises:
a coupling transistor having a first end receiving a first control signal and a second end; and
a coupling capacitor, having a first end coupled to the first end of the coupling transistor, and a second end coupled to the second end of the coupling transistor,
wherein the photo sensing unit comprises:
a photo sensing transistor having a first end receiving a second control signal, a second end receiving a third control signal, and a third end coupled to a third end of the coupling transistor;
a storage capacitor having a first end coupled to the third end of the photo sensing transistor and a second end receiving a fourth control signal;
a selection transistor, having a first end receiving a fifth control signal, a second end coupled to the first end of the storage capacitor, and a third end coupled to a readout line for outputting the judging signal; and
an amplifying transistor, having a first end coupled to the first end of the storage capacitor, a second end receiving the fifth control signal, and a third end coupled to the second end of the selection transistor,
wherein the first control signal is a negative pulse signal, wherein the second, the third and the fourth control signals are reference potentials, and wherein the fifth control signal is a system potential.

9. A photo sensing device comprising:
a photo sensing unit, sensing whether a touch event has occurred or not, and accordingly outputting a judging signal; and
a coupling unit, coupled to the photo sensing unit, for enhancing sensitivity of the photo sensing unit, so as to increase a difference between the judging signal associated with occurrence of the touch event and the judging signal associated with non-occurrence of the touch event,
wherein the coupling unit comprises:
a coupling transistor having a first end receiving a first control signal and a second end; and
a coupling capacitor, having a first end coupled to the first end of the coupling transistor, and a second end coupled to the second end of the coupling transistor,
wherein the photo sensing unit comprises:
a photo sensing transistor having a first end receiving a second control signal, a second end receiving a third control signal, and a third end coupled to a third end of the coupling transistor;
a storage capacitor having a first end coupled to the third end of the photo sensing transistor and a second end receiving a fourth control signal; and
an amplifying transistor, having a first end coupled to the first end of the storage capacitor, a second end receiving a system potential, and a third end coupled to a readout line for outputting the judging signal,
wherein the first control signal is a negative pulse signal, and wherein the second, the third and the fourth control signals are positive pulse signals.

10. The photo sensing device as claimed in claim 9, wherein the coupling transistor, the photo sensing transistor and the amplifying transistor are N-type transistors.

11. A photo sensing device comprising:
a photo sensing unit, sensing whether a touch event has occurred or not, and accordingly outputting a judging signal; and
a coupling unit, coupled to the photo sensing unit, for enhancing sensitivity of the photo sensing unit, so as to increase a difference between the judging signal associated with occurrence of the touch event and the judging signal associated with non-occurrence of the touch event,
wherein the coupling unit comprises:
a coupling transistor having a first end receiving a first control signal and a second end; and
a coupling capacitor, having a first end coupled to the first end of the coupling transistor, and a second end coupled to the second end of the coupling transistor,
wherein the photo sensing unit comprises:
a photo sensing transistor having a first end receiving a second control signal, a second end receiving a third control signal, and a third end coupled to a third end of the coupling transistor;
a storage capacitor having a first end coupled to the third end of the photo sensing transistor and a second end receiving a fourth control signal; and
an amplifying transistor, having a first end coupled to the first end of the storage capacitor, a second end receiving a system potential, and a third end coupled to a readout line for outputting the judging signal,
wherein the first control signal is a negative pulse signal, wherein the second and the third control signals are reference potentials, and wherein the fourth control signal is a positive pulse signal.

* * * * *